United States Patent
Abbel

(10) Patent No.: US 6,658,920 B2
(45) Date of Patent: Dec. 9, 2003

(54) LEAK DETECTOR PUMP

(75) Inventor: Karl Abbel, Braunfels (DE)

(73) Assignee: Pfeiffer Vacuum GmbH, Asslar (DE)

( * ) Notice: Subject to any disclaimer, the term of this patent is extended or adjusted under 35 U.S.C. 154(b) by 0 days.

(21) Appl. No.: 10/012,581

(22) Filed: Nov. 5, 2001

(65) Prior Publication Data

US 2002/0100313 A1 Aug. 1, 2002

(30) Foreign Application Priority Data

Nov. 7, 2000 (DE) .......................................... 100 55 057

(51) Int. Cl.$^7$ ................................................. G01M 3/04
(52) U.S. Cl. ............................................ 73/40; 73/40.7
(58) Field of Search ........................... 73/40, 40.7, 23.2

(56) References Cited

U.S. PATENT DOCUMENTS

| | | | | |
|---|---|---|---|---|
| 3,327,521 A | * | 6/1967 | Briggs ......................... | 73/40.7 |
| 4,583,394 A | * | 4/1986 | Murakami et al. ........... | 73/40.7 |
| 5,134,877 A | * | 8/1992 | Gilles et al. ................. | 73/40.7 |
| 5,341,671 A | * | 8/1994 | Baret et al. .................. | 73/40.7 |
| 5,372,031 A | * | 12/1994 | Harmand ...................... | 73/40 |
| 5,537,857 A | * | 7/1996 | Grosse Bley ................ | 73/40.7 |
| 5,561,240 A | * | 10/1996 | Ochiai et al. ................ | 73/40.7 |
| 5,728,929 A | * | 3/1998 | Gevaud ........................ | 73/40 |
| 5,889,199 A | * | 3/1999 | Wong et al. .................. | 73/40 |
| 5,907,092 A | * | 5/1999 | Bohm ......................... | 73/40.7 |
| 6,119,507 A | * | 9/2000 | Flosbach et al. ............. | 73/40.7 |
| 6,196,056 B1 | * | 3/2001 | Ewing et al. ................ | 73/40.7 |
| 6,263,724 B1 | * | 7/2001 | Devance ..................... | 73/40.7 |
| 6,282,945 B1 | * | 9/2001 | Weldon et al. ................ | 73/40 |
| 6,367,311 B1 | * | 4/2002 | Garg ........................ | 73/40.5 R |

FOREIGN PATENT DOCUMENTS

JP     363215932 A   *  9/1988  ................... 73/40

* cited by examiner

*Primary Examiner*—Edward Lefkowitz
*Assistant Examiner*—Michael Cygan
(74) *Attorney, Agent, or Firm*—Sidley Austin Brown & Wood, LLP

(57) ABSTRACT

A leak detector pump, including a housing having a gas outlet and a plurality of gas inlet unions, components of a high vacuum pump located in the housing, a gas analyzer associated with the housing, a union for introducing test fluid into the housing, a plurality of valve members located in the housing for controlling gas flow, and a plurality of connection elements located in the housing for guiding the gas flow between different components of the leak detector pump.

4 Claims, 1 Drawing Sheet

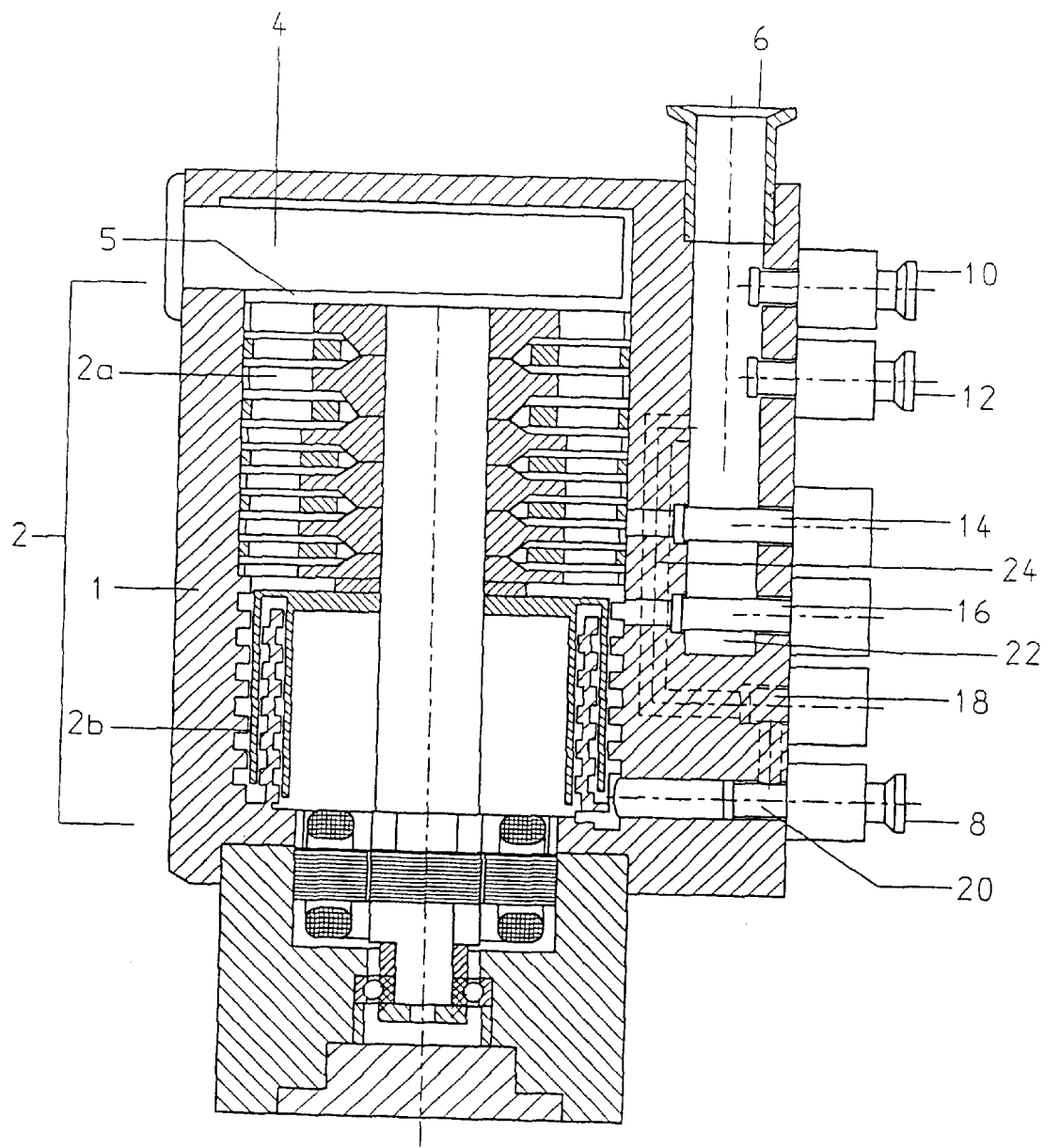

LEAK DETECTOR PUMP

BACKGROUND OF THE INVENTION

1. Field of the Invention

The present invention relates to a leak detector pump including essentially components of a high vacuum pump, gas analysator, union for test fluid, gas outlet opening, gas inlet unions, valve elements, and connections for guiding the gas between different components of the leak detector pump.

2. Description of the Prior Art

For determining leakage in vacuum chambers and other vessels belonging to a vacuum system, such as pump chambers, connection elements, valves, measuring systems, etc..., different types of leak indicators are used. In the field of vacuum technology, generally, devices are used with which a leak location is determined by introducing a test gas from outside and by determining its presence in particular locations with a gas detector. As gas detectors, preferably, mass-spectrometers are used. The mass-spectrometers function as gas analyzers which measure partial pressures of a gas mixture and which, in this way, determine presence of even the smallest amounts of the test gas.

For a rapid and precise localization of leaks, in addition to a gas detector, an evacuation system, which consists of a high vacuum pump, one or more fore-vacuum pumps, and a system of connection conduits and valves is necessary. As high vacuum pumps, turbomolecular pumps, which operate based on a counterflow principle in this case, proved to be advantageous. Such systems are disclosed in German publications DE-OS 16 48 648, DE-OS 31 24 205, and U.S. Pat. No. 5,561,240. The structure of conventional leak indication system is very complex. In addition to a gas detector, the main components of such systems are vacuum pumps, connection elements, valves, measuring instruments, and sealing elements. The leak indication system is formed of several components.

A complex leak indication system has many drawbacks. Among those drawbacks are a large volume of such systems and a big weight. These drawbacks prevent wide use of such systems, in particular when universal and rapidly insertable as well as easily transportable apparatuses are required. During the operation of such systems, the reduction in the suction capacity and, thus, increase in the pumping time, increased response time due to a complicated gas flow should all be taken into account. Also should be taken into account sealing problems associated with a large number of releasable connections and, thereby, a possibility of an error, when using different measuring methods, resulting from the permeation of the test gas from outside into the system. All of the other problems and uncertainties, which are encountered in a system including many separate components, likewise should be taken into account. Maintenance and repair works of such a system increases operational costs.

Accordingly an object of the present invention is to eliminate or reduce, to a most possible extent, the drawbacks of prior art leak detection systems.

Another object of the present invention is to provide a leak detection or indication system which is simple, and thereby, cost-effective.

A further object of the present invention is to provide a leak detection or indication system that can be easily installed.

A still further object of the present invention is to provide a leak detection or indication system that is effective and reliable in operation.

SUMMARY OF THE INVENTION

These and other objects of the present invention, which will become apparent hereinafter, are achieved by providing a leak detection pump all of the components of which are located in the pump housing or form components thereof.

According to the present invention, the pump system for determination of leaks is formed as a pump detector pump having a simple structure, a smaller volume, and a smaller weight than conventional leak indications systems. The leak detector pump according to the present invention has a universal application and can easily be put into operation. It has low manufacturing costs. A complex conduit system prevents the reduction of the suction capacity and provides for control of sensitivity. The problems of the test gas permeation from outside into the system and, thus, the uncertainty of the measurement results, is reduced to a most possible extent. A further advantage of the leak detector pump according to the present invention consists in the reduction of maintenance and repair works.

The novel features of the present invention, which are considered as characteristic for the invention, are set forth in the appended claims. The invention itself, however, both as to its construction and its mode of operation, together with additional advantages and objects thereof, will be best understood from the following detailed description of preferred embodiments, when read with reference to the accompanying drawings.

BRIEF DESCRIPTION OF THE DRAWINGS:

Single FIGURE of the drawings shows a cross-sectional view of a leak detector pump according to the present invention.

DETAILED DESCRIPTION OF THE PREFERRED EMBODIMENT

A high vacuum pump 2, which is located in a housing 1, is formed as a combination of a turbomolecular pump 2a and a Holweckpump 2b. This pump combination can be enlarged by adding other different pump systems, such as, e.g., as a regenerative pump. Such a combination makes possible an expulsion into atmosphere after achieving high vacuum pressures. A gas analyzer 4 directly adjoins the high vacuum side of the turbomolecular pump. The gas analyzer 4 is also located in the housing 1. Alternatively, the gas analyzer 4 can be formed as a separate component and be connected with the suction side 5 of the pump combination. At the high pressure side, there is provided a gas outlet 8 which communicates either with a fore-vacuum pump or with the atmosphere. The housing 1 is further provided with a test union 6 and with further unions 10 and 12 for introduction of gases for different purposes (e.g., for rinsing or flooding the combination pump). In the housing 1, there are further provided a plurality of valve members 14, 16, 18, 20 for controlling the gas flow in accordance with different operational conditions of the leak detector pump. The house 1 is further provided with connections 22 and 24 which can be used for guiding gas when required by existing operational conditions. As shown in the drawing, the valve members 14, 16, 18, 20 and the connection 22, 24 are integrated into the wall of the housing 1.

Below, different operational conditions of the leak detector pump according to the present invention are listed. Under separate operational conditions, the listed valves are open while all of the other valves are closed. The gas outlet is connected with a fore-vacuum pump.

Valve 18 evacuation of test fluid.

Valve 20 evacuation of the analyzer 4 and the high vacuum pump 2.

Valves 14 and 20 connection of the analyzer 4 with the source of the test fluid over the high vacuum pump 2 for small leaks (high sensitivity).

Valves 16 and 20 connection of the analyzer 4 with the source of the test fluid via the high vacuum pump 2 for large leaks (low sensitivity).

Valves 14 and 20 introduction of a test gas through the union 10 for calibration purposes.

Valve 14 aeration of the test fluid through the union 12.

Though the present invention was shown and described with references to the preferred embodiment, such are merely illustrative of the present invention and are not to be construed as a limitation thereof, and various modifications to the present invention will be apparent to those skilled in the art. It is, therefore, not intended that the present invention be limited to the disclosed embodiment or details thereof, and the present invention includes all of variations and/or alternative embodiments within the spirit and scope of the present invention as defined by the appended claims.

What is claimed is:

1. A leak detector pump, comprising a housing having a gas outlet and a plurality of gas inlet unions; components of a high vacuum pump located in the housing; a gas analyzer associated with the housing; a union for introducing test fluid into the housing; a plurality of valve members integrated in a wall of the housing for controlling gas flow in the housing; and a plurality of connection elements likewise integrated in a wall of the housing for guiding the gas flow between different components of the leak detector pump.

2. A leak detector pump as set forth in claim 1, wherein the gas analyzer is formed as a separate component connected to a suction side of the high vacuum pump.

3. A leak detector pump as set forth in claim 1, wherein the high vacuum pump is formed as a turbomolecular pump.

4. A leak detector pump as set forth in claim 1, wherein the high vacuum pump is formed as a combination pump consisting of at least two pump systems.

* * * * *